United States Patent [19]  [11]  4,241,191
Keppler et al.  [45]  Dec. 23, 1980

[54] MANUFACTURE OF STYRENE SUSPENSION POLYMERS

[75] Inventors: Hans G. Keppler, Weinheim; Erhard Stahnecker, Heidelberg; Rolf Moeller, Ludwigshafen, all of Fed. Rep. of Germany

[73] Assignee: BASF Aktiengesellschaft, Fed. Rep. of Germany

[21] Appl. No.: 963,327

[22] Filed: Nov. 24, 1978

Related U.S. Application Data

[63] Continuation of Ser. No. 765,158, Feb. 3, 1977, abandoned.

[30] Foreign Application Priority Data

Mar. 5, 1976 [DE] Fed. Rep. of Germany . 2609104

[51] Int. Cl.$^3$ .............................. C08J 9/18; C08J 9/20
[52] U.S. Cl. ........................................ 521/56; 521/60; 521/85; 521/106; 521/139; 525/255; 526/201; 526/203; 526/226; 526/233; 526/346; 526/910
[58] Field of Search ............... 526/201, 203, 226, 346, 526/233, 910; 521/56, 60; 525/255

[56] References Cited

U.S. PATENT DOCUMENTS

| 2,888,410 | 5/1959 | Buchholtz | 521/56 |
| 3,001,954 | 9/1961 | Buchholtz et al. | 521/56 |
| 3,047,534 | 7/1962 | Dyer et al. | 525/255 |
| 3,243,419 | 3/1966 | Ingram | 521/56 |
| 3,462,380 | 8/1969 | Ronden et al. | 521/56 |
| 3,468,820 | 9/1969 | Buchholtz et al. | 521/56 |
| 3,696,172 | 10/1972 | Kaibo et al. | 525/255 |
| 3,758,425 | 9/1973 | Jastrow et al. | 521/56 |
| 3,786,115 | 1/1974 | Osuga et al. | 525/255 |
| 3,912,794 | 10/1975 | Bracke | 525/255 |
| 3,919,355 | 11/1975 | Ballova et al. | 525/255 |
| 4,036,794 | 7/1977 | Keppler et al. | 521/56 |
| 4,110,413 | 8/1978 | Kuhar | 525/255 |
| 4,141,932 | 2/1979 | Butler | 525/255 |

Primary Examiner—Morton Foelak
Attorney, Agent, or Firm—Keil & Witherspoon

[57] ABSTRACT

Styrene polymers are prepared by suspension polymerization using, as suspension stabilizers, mixtures of
(A) a sparingly soluble inorganic metal compound and
(B) a fine polymer dispersion.

The styrene polymers may be used, together with blowing agents, for the manufacture of foams.

13 Claims, No Drawings

MANUFACTURE OF STYRENE SUSPENSION POLYMERS

This is a continuation of application Ser. No. 765,158, filed Feb. 3, 1977, now abandoned.

The present invention relates to a process for the manufacture of styrene bead polymers by suspension polymerization.

A suitable process for the manufacture of styrene bead polymers is suspension polymerization, in which the monomers are suspended in the form of fine droplets in water and are polymerized at elevated temperatures in the presence of initiators. When this process is carried out industrially, it is necessary to use suspension stabilizers to prevent coalescence of the polymerizing monomer droplets. The suspension stabilizers should permit reliable stabilization and should be useful under a variety of conditions.

In practice, the suspension stabilizers used are mostly macromolecular organic compounds which are water-soluble or water-dispersible. Examples are homopolymers or copolymers of vinylpyrrolidone, polymers of acrylic acid, polyvinyl alcohols and cellulose ethers. The use of Pickering dispersants, i.e. water-insoluble inorganic compounds, has also been disclosed and is described, for example, in Houben-Weyl, Volume XIV/1 (1961), pages 420 et seq. Examples of such inorganic compounds are sparingly soluble alkaline earth metal phosphates, carbonates, sulfates and silicates. Calcium phosphates are used most commonly. These inorganic compounds are as a rule employed in combination with small amounts of genuine emulsifiers or surfactants (Houben-Weyl, Volume OV/1, page 425). Examples of suitable emulsifiers are sodium dodecylsulfonate, sodium octylsulfate, sodium dioctyl sulfosuccinate, alkali metal laurylsulfates and alkali metal salts of fatty acids.

Compared to organic suspension stabilizers, these systems are of limited applicability, since reproducible handling, and trouble-free suspension polymerization, are only possible within a relatively narrow range. Houben-Weyl, page 420, records that: "It is virtually impossible to specify conditions under which a pulverulent dispersing agent might be capable of broad application". In the combination of inorganic compounds with surfactants, the optimum dosage must be adhered to precisely, since both too little and too much of the surfactant can cause coagulation of the batch.

On the other hand, the use of Pickering dispersants has some advantages over the use of organic suspension stabilizers. Thus, the polymer beads obtained have a lower inner water content, as a result of which the lengthy drying of the polymer beads, which is normally necessary, can be reduced or at times entirely omitted. Furthermore, there is far less contamination of the effluent, since the pigment particles remaining therein can be separated off by simple sedimentation.

It is an object of the present invention to provide a process which permits reliable and reproducible use of Pickering dispersants in the suspension polymerization of styrene.

We have found that this object is achieved, according to the invention, by using mixtures of Pickering dispersants and a polymer dispersion as the suspension stabilizers.

Accordingly, the invention relates to a process for the manufacture of styrene homopolymers or copolymers by polymerizing the monomers in aqueous suspension in the presence of suspension stabilizers, wherein the suspension stabilizers used comprise from 0.05 to 1% by weight, based on the suspension, of a mixture of:

(A) from 99 to 50% by weight of a sparingly soluble inorganic metal compound and (B) from 1 to 50% by weight of a finely divided polymer of from 100 to 90 parts by weight of monomers which form water-insoluble homopolymers and from 0 to 10 parts by weight of monomers which form water-soluble homopolymers.

The process may be used for the manufacture of homopolymers of styrene and for the copolymerization of monomer mixtures which preferably contain not less than 50% by weight of styrene. Suitable comonomers are acrylonitrile, esters of acrylic acid or methacrylic acid with alcohols of 1 to 8 carbon atoms, N-vinyl compounds, e.g. vinylcarbazole, or small amounts of compounds which contain two double bonds, e.g. butadiene, divinylbenzene or butanediol diacrylate.

The polymers formed in the process according to the invention are obtained in the form of fine beads. If the suspension polymerization is carried out in the presence of suitable blowing agents, expandable bead polymers are obtained. Expandable polystyrenes are of particular importance in this context. To produce expandable polymer beads, the blowing agent may be added to the suspension before, during or after the polymerization. Suitable blowing agents are hydrocarbons which are gaseous or liquid at standard temperature and pressure, do not dissolve the styrene polymer and boil below the softening point of the polymer. Examples of suitable blowing agents are propane, butane, pentane, cyclopentane, hexane, cyclohexane and halogenated hydrocarbons, e.g. methyl chloride, dichlorodifluoromethane or trifluorochloromethane, and mixtures of the said compounds. The blowing agents are in most cases used in amount of from 3 to 12% by weight, based on the monomers.

The polymerization is started by organic polymerization initiators which decompose thermally to give free radicals which initiate polymerization. Conventional initiators include, for example, peroxides, e.g. benzoyl peroxide, lauroyl peroxide, tert.-butyl perbenzoate, tert.-butyl peroctoate and tert.-butyl perpivalate, or unstable azo compounds, e.g. azodiisobutyronitrile. In general, the initiators are employed in amounts of from 0.01 to 1% by weight, based on the monomers. The nature of the initiator to be used depends on the envisaged polymerization temperature. It is particularly advantageous to use mixtures of initiators, in which case the polymerization temperature can be chosen in accordance with the half-life of the initiator. As a rule, the polymerization temperature is from 60° to 150° C. and preferably from 80° to 120° C.

In the case of the expandable polystyrene beads, in particular, the processing properties greatly depend on the cell structure. The latter, which may be characterized, for example, by specifying the number of cells per $mm^3$, may be controlled by using cell regulators.

The production of flameproof styrene polymers requires flameproofing agents which can frequently even be added to the suspension polymerization reaction mixture. Organic halogen compounds, preferably brominated organic compounds, are particularly suitable for this purpose, examples being hexabromocyclododecane and tris-(dibromopropyl) phosphate.

The polymerization batch may contain organic or inorganic fillers, antistatic agents or plasticizers as further components.

According to the invention, the suspension contains from 0.05 to 1% by weight, preferably from 0.1 to 0.6% by weight, based on the suspension, of a stabilizer which comprises two components A and B.

This mixture contains from 99 to 50% by weight, preferably from 95 to 60% by weight, of a sparingly water-soluble inorganic metal compound A. This may be, for example, a sparingly soluble carbonate, phosphate, sulfate, silicate, oxide or hydroxide. It is also possible, and at times advantageous, to use mixtures of sparingly soluble inorganic metal compounds.

Examples of very suitable sparingly soluble compounds are phosphates of divalent or trivalent metals, e.g. calcium, barium, strontium, magnesium, aluminum, zinc, iron, cobalt and manganese. Aluminum hydroxide and barium sulfate may be mentioned as examples of suitable sparingly soluble hydroxides or sulfates; barium carbonate may also be used.

Sparingly soluble metal phosphates are, for example, obtained by reacting phosphate ions with suitable metal salts in aqueous solution. Sparingly soluble calcium phosphates are produced, for example, by mixing a sodium phosphate solution and a calcium chloride solution, whilst stirring. However, sparingly soluble metal phosphates can also be produced by reacting the corresponding metal oxides or metal hydroxides with orthophosphoric acid.

Sparingly soluble metal phosphates, especially calcium phosphates, are preferred. Amongst these in turn, salts with 3 or more equivalents of a base, or mixtures of products with more than 3 equivalents of a base and of products with less than 3 equivalents of a base, are preferred. Examples are tricalcium phosphate, hydroxylapatite and other phosphates possessing an apatite lattice.

The particle size of the sparingly soluble metal compounds A may vary within wide limits, from 0.01 to 100 $\mu$m, depending on the method of manufacture and form of the compound; in the case of hydroxylapatite, the preferred particle size is predominantly from 0.01 to 0.1 $\mu$m.

The sparingly soluble inorganic metal compound is preferentially manufactured, and used, as a fine aqueous dispersion. However, in principle it is also possible to isolate and dry these particles and obtain the appropriate particle size distribution by milling.

In addition to component A, the mixture contains from 1 to 50% by weight, preferably from 5 to 40% by weight, of a finely divided polymer of from 100 to 90 parts by weight of monomers which form water-insoluble homopolymers and from 0 to 10 parts by weight of monomers which form water-soluble homopolymers. Examples of monomers which form water-insoluble polymers are vinyl esters of saturated monocarboxylic acids of 2 to 12 carbon atoms, e.g. vinyl acetate, vinyl propionate, vinyl n-butyrate, vinyl laurate, vinyl stearate and vinyl esters of Versatic acids, esters of $\alpha,\beta$-olefinically unsaturated monocarboxylic acids and dicarboxylic acids, preferably of 3 to 5 carbon atoms, with straight-chain, branched or cyclic alkanols of 1 to 18 C atoms, e.g. the methyl, ethyl, n-butyl, tert.-butyl, cyclohexyl, 2-ethylhexyl, lauryl or stearyl esters of acrylic acid, methacrylic acid, crotonic acid, maleic acid, fumaric acid or itaconic acid, vinyl-aromatic monomers, e.g. styrene, $\alpha$-methylstyrene, vinyltoluenes, vinylxylenes, vinylethylbenzenes and chlorostyrenes, nitriles of $\alpha,\beta$-olefinically unsaturated carboxylic acids, e.g. acrylonitrile or methacrylonitrile, vinyl halides and vinylidene halides, e.g. vinyl chloride and vinylidene chloride, 1,3-dienes, e.g. butadiene and isoprene, and mixtures of these monomers.

The finely divided polymers may also contain small proportions, namely up to 10% by weight, preferably from 0.5 to 6% by weight, of comonomers which when polymerized alone form water-soluble homopolymers, e.g. $\alpha,\beta$-olefinically unsaturated monocarboxylic acids or dicarboxylic acids, preferably of 3 to 5 carbon atoms, or their amides, which may or may not be substituted, e.g. acrylic acid, methacrylic acid, crotonic acid, maleic acid, itaconic acid, acrylamide, methacrylamide, crotonamide and itaconamide, and also vinylsulfonic acid, vinylphosphonic acid and their salts, and heterocyclic N-vinyl compounds.

Preferred finely divided polymers B are emulsion polymers of styrene, butadiene, vinyl chloride, vinylidene chloride, vinyl esters or acrylic or methacrylic esters. The polymers are again advantageously in the form of aqueous dispersions, the particles of which may be very fine and may, for example, have diameters of from 0.001 to 1 $\mu$m. However, agglomerated particles are also usable, in which case particle sizes of up to 10 $\mu$m, and even more, are possible. The use of polystyrene dispersions is preferred. The polymer dispersions are preferably manufactured by polymerization in an aqueous emulsion in the presence of initiators and emulsifiers. A detailed description of emulsion polymerization is given in Houben-Weyl, Volume XIV/1, pages 190 et seq. The emulsion polymerization may be carried out as a one-vessel process, in which the entire reaction mixture is initially introduced into a reaction vessel, and then polymerized. However, it is also possible to use a process in which the monomers are metered in continuously or batchwise. Dispersions of polymers of heterogeneous structure can be produced by stepwise addition of different monomers or monomer mixtures. Finally, polymer dispersions in which the particle size has been increased by means of a suitable agglomeration process are also suitable.

The solids content of the polymer dispersions is of minor importance but it may at times be advantageous to bring the solids concentration of the polymer dispersion to below 20% by weight. If the polymer dispersion is manufactured by emulsion polymerization, the compatibility of the dispersion with the suspension polymerization batch should be borne in mind.

The suspension stabilizers A and B may be added to the suspension in various ways. For example, the metal compound A may be introduced into the aqueous phase of the suspension before starting the polymerization, and the finely divided polymer B may then be metered into the suspension in the course of the polymerization, preferably when the monomer conversion is from 5 to 40%. It is advantageous to produce the metal compound by precipitation in situ in the aqueous phase before starting the polymerization. Another possible method is to premix the metal compound A and the finely divided polymer B and to meter this mixture, advantageously in the form of a relatively concentrated aqueous dispersion, into the suspension before or during the polymerization, preferably when the monomer conversion is from 5 to 40%.

The process according to the invention for suspension polymerization using Pickering dispersants in combination with polymer dispersions is distinguished by broad adaptability. Thus, the composition and method of manufacture of the polymer dispersion, and the proportion of dispersion used — based on the total batch — can be varied within wide limits and can, where necessary, be adapted to suit special applications of the suspension polymerization process. By contrast — as already mentioned — the conventional use of emulsifiers in combination with Pickering dispersants in suspension polymerization is only feasible within very narrow limits. This applies both to the amount of emulsifier used and to the time at which the latter is added.

In particular, the spectrum of bead size can be deliberately controlled by the way in which the suspension stabilizers are metered in. This is made clear by the Examples which follow. The bead size spectrum is particularly important in the case of expandable polymer beads for the manufacture of foams.

The process according to the invention is above all distinguished by the absence of the above disadvantages; it combines the advantages of Pickering dispersants, in respect of lower inner water content of the polymer beads and easily treated effluent, with the advantages of organic suspension stabilizers in respect of stabilizing action and control of the bead spectrum.

In the Examples, parts and percentages are by weight.

EXAMPLES

A. Manufacture of Sparingly Soluble Calcium Phosphates

A 1. Precipitation of calcium phosphate from $Na_3PO_4.12\ H_2O$ and $CaCl_2.2\ H_2O$ (molar ratio 1:1.62):

A solution of 147 g of $CaCl_2.2\ H_2O$, dissolved in 500 ml of water, is added uniformly in the course of 10 minutes to a solution of 228 g of $Na_3PO_4.12\ H_2O$ in 500 ml of water, whilst stirring at room temperature. The resulting suspension of the calcium phosphate precipitate is used as the phosphate component of the suspension stabilizers.

A 2. Precipitation of calcium phosphate from $Na_3PO_4.12\ H_2O$ and $CaCl_2.2\ H_2O$ (molar ratio 1:2.02):

The process of manufacture is carried out by the method described in A 1. However, the calcium phosphate precipitate is produced by adding 184 g of $CaCl_2.2\ H_2O$, dissolved in 500 ml of water.

B. Manufacture of Polymer Dispersions

B 1. Polystyrene dispersion 20 parts of a mixture of 100 parts of styrene, 180 parts of water, 1.25 parts of $K_2S_2O_8$, 0.5 part of $Na_4P_2O_7$ and 5 parts of Na dodecylsulfonate (40% strength) are initially introduced into a stirred vessel and polymerization is started by heating to 80° C. 10 minutes after reaching 80° C., the remainder of the mixture is metered in uniformly over 3 hours. To complete the polymerization, the reaction mixture is left for a further hour at 80° C., whilst stirring. The solids content is 36%. The pH is brought to 8 by adding dilute sodium hydroxide solution.

B 2. Poly-n-butyl acrylate dispersion

This is manufactured as described in B 1, but 100 parts of n-butyl acrylate and 10 parts of sodium laurylsulfate (20% strength) are used.

B 3–B 9. Copolymer dispersion

The following monomer mixtures were used to manufacture copolymer dispersions:

B 3: 60 parts of styrene, 38 parts of butadiene and 2 parts of acrylic acid.

B 4: 80 parts of vinyl chloride and 20 parts of methyl acrylate.

B 5: 70 parts of butadiene and 30 parts of styrene.

B 6: 98 parts of styrene and 2 parts of acrylamide.

B 7: 50 parts of n-butyl acrylate, 48 parts of vinyl acetate and 2 parts of acrylic acid.

B 8: 91 parts of vinylidene chloride and 9 parts of methyl acrylate.

B 9: 48 parts of styrene, 48 parts of butadiene, 2 parts of acrylic acid and 2 parts of acrylamide.

C. Suspension polymerizations

Examples C 1 to C 12:

100 parts of spring water (16° of German hardness), 100 parts of styrene, 0.15 part of dibenzoyl peroxide and 0.30 part of t-butyl perbenzoate are introduced into a stirred vessel. This mixture is polymerized for 6 hours at 90° C. and then for 6 hours at 115° C., whilst stirring. The suspension stabilizers indicated in Table 1 are added as a 10% strength aqueous dispersion at various times, calculated from the start of the polymerization (taken to be when 90° C. is reached). 3 hours after reaching 90° C., 7 parts of n-pentane are added as the blowing agent.

TABLE 1

| | Suspension stabilizer mixture | | | | Time at which added (minutes) | Bead size in mm Sieve analysis in % | | | | | | | | |
|---|---|---|---|---|---|---|---|---|---|---|---|---|---|---|
| Example | Parts of calcium phosphate suspension according to Example A | | Parts of finely divided polymer (10% strength) | | | 2.5 | 2.0 | 1.6 | 1.25 | 1.0 | 0.8 | 0.63 | 0.4 | <0.4 |
| C1 | 6.9 | A1 | 4.0 | B1 | 110 | 0.5 | 1.0 | 29.0 | 37.5 | 15.5 | 7.0 | 5.0 | 2.0 | 1.5 |
| C2 | 7.25 | A1 | 2.0 | B1 | 90 | 1.0 | 1.5 | 10.5 | 19.0 | 29.0 | 24.5 | 11.0 | 3.0 | 0.5 |
| C3 | 7.25 | A1 | 1.3 | B1 | 100 | 1.5 | 10.0 | 20.5 | 39.5 | 20.0 | 4.5 | 2.5 | 1.0 | 0.5 |
| C4 | 7.25 | A1 | 0.4 | B1 | 80 | 1.0 | 1.5 | 4.0 | 5.5 | 10.5 | 26.0 | 33.0 | 17.0 | 1.5 |
| C5 | 7.5 | A2 | 3.0 | B1 | 100 | 2.0 | 4.5 | 25.0 | 32.5 | 18.0 | 11.0 | 4.5 | 1.5 | 1.0 |
| C6 | 7.5 | A2 | 1.5 | B1 | 90 | 2.5 | 4.5 | 6.0 | 19.0 | 19.0 | 24.5 | 11.0 | 3.0 | 0.5 |
| C7 | 6.5 | A2 | 3.5 | B2 | 100 | 0.5 | 1.5 | 14.5 | 31.0 | 23.5 | 16.5 | 7.5 | 4.0 | 1.0 |
| C8 | 7.5 | A1 | 4.0 | B3 | 110 | 1.0 | 1.5 | 4.0 | 5.5 | 19.5 | 26.0 | 42.0 | 17.0 | 1.5 |
| C9 | 7.5 | A1 | 4.0 | B4 | 100 | 2.0 | 3.0 | 22.5 | 29.0 | 20.5 | 12.0 | 6.5 | 2.5 | 2.0 |
| C10 | 7.5 | A1 | 2.0 | B5 | 95 | 1.5 | 2.5 | 10.5 | 14.5 | 20.0 | 21.0 | 24.5 | 3.5 | 2.0 |
| C11 | 7.5 | A1 | 3.0 | B6 | 70 | — | 0.5 | 2.5 | 4.0 | 5.5 | 23.5 | 38.0 | 23.5 | 2.5 |
| C12 | 7.0 | A1 | 2.5 | B7 | 90 | 0.5 | 1.5 | 14.5 | 31.0 | 17.5 | 15.0 | 12.5 | 5.5 | 2.0 |

Examples C 13 to C 20.

100 parts of spring water (16° German hardness) are first introduced into a stirred vessel and 0.92 part of Na$_3$PO$_4$.12 H$_2$O is dissolved therein. In order to form a calcium phosphate precipitate, 0.6 part of CaCl$_2$.2 H$_2$O, dissolved in 6 parts of water, is added whilst stirring. 100 parts of styrene, 0.15 part of dibenzoyl peroxide and 0.30 part of t-butyl perbenzoate are then added. This mixture is polymerized, whilst stirring, for 6 hours at 90° C. and then for 6 hours at 115° C. The individual Examples differ in respect of the nature and amount of the polymer dispersion added (see Table 2). Three hours after reaching 90° C., 7 parts of n-pentane were added.

TABLE 2

| Example | Polymer dispersion Composition | Parts of 10% strength dispersion | Time which added (minutes) | Sieve analysis (mesh width in mm) (weight %) | | | | | | | |
|---|---|---|---|---|---|---|---|---|---|---|---|
| | | | | 2.5 | 2.0 | 1.6 | 1.25 | 1.0 | 0.8 | 0.63 | 0.4 | <0.4 |
| C13 | B2 | 0.2 | 110 | 0.5 | 1.0 | 15.0 | 39.5 | 20.5 | 19.5 | 2.0 | 1.5 | 1.0 |
| C14 | B6 | 0.2 | 95 | 1.0 | 4.5 | 31.5 | 25.0 | 25.5 | 8.0 | 2.0 | 2.0 | 0.5 |
| C15 | B7 | 0.1 | 110 | 0.5 | 1.5 | 14.5 | 31.0 | 17.5 | 13.0 | 16.5 | 3.5 | 2.0 |
| C16 | B4 | 0.1 | 110 | 0.5 | 1.0 | 15.5 | 39.5 | 17.5 | 13.0 | 8.0 | 4.5 | 0.5 |
| C17 | B8 | 0.15 | 110 | 1.0 | 3.0 | 17.5 | 33.0 | 21.5 | 15.0 | 6.0 | 2.5 | 0.5 |
| C18 | B9 | 0.25 | 110 | 1.0 | 1.0 | 4.0 | 20.5 | 27.5 | 26.0 | 13.5 | 5.5 | 1.0 |
| C19 | B1 | 0.05 | 60 | 5.5 | 7.5 | 36.5 | 30.0 | 11.0 | 5.5 | 2.5 | 1.5 | — |
| C20 | B1 | 4.0 | 115 | 0.5 | 1.0 | 25.0 | 37.5 | 14.5 | 11.0 | 5.0 | 4.0 | 1.5 |

D. Examples with further sparingly soluble inorganic compounds.

Example D 1, with iron-III phosphate as the sparingly soluble inorganic compound.

The method is as described for Examples C 13–C 20. However, 1.113 parts of Na$_3$PO$_4$.12 H$_2$O and 1.08 parts of FeCl$_3$.6 H$_2$O are used. Before adding the organic phase, the pH is brought to 8 with dilute NaOH. 40 minutes after reaching a temperature of 90° C., 1.33 parts of a 4% strength copolymer dispersion (B$_7$) are added.

The bead polymer has the following bead size distribution:

| mm φ: | 2.0 | 1.6 | 1.25 | 1.0 | 0.8 | 0.63 | 0.4 | <0.4 |
|---|---|---|---|---|---|---|---|---|
| %: | 2.0 | 14.5 | 29.5 | 19.0 | 21.0 | 8.5 | 3.5 | 2.0 |

Example D 2, with an aluminum phosphate as the sparingly soluble inorganic compound.

The method is as described for Examples C 13–C 20. However, 0.92 part of Na$_3$PO$_4$.12 H$_2$O and 0.78 part of AlCl$_3$.6 H$_2$O are used. 100 minutes after reaching 90° C., 0.665 part of a 4% strength polybutadiene copolymer dispersion (B$_9$) is added.

The bead polymer has the following bead size distribution:

| mm φ: | 2.5 | 2.0 | 1.6 | 1.25 | 1.0 | 0.8 | 0.63 | 0.4 | <0.4 |
|---|---|---|---|---|---|---|---|---|---|
| %: | 0.5 | 2.5 | 16.5 | 31.0 | 23.5 | 14.5 | 6.5 | 3.5 | 1.5 |

Example D 3, with a magnesium phosphate as the sparingly soluble inorganic compound.

The method is as described for Examples C 13–C 20. However, 0.7 part of Na$_3$PO$_4$.12 H$_2$O and 0.64 part of MgCl$_2$.6 H$_2$O are used. 30 minutes after reaching 90° C., 0.4 part of a 5% strength poly(butyl acrylate) dispersion (B$_2$) is added.

The bead polymer has the following bead size distribution:

| mm φ: | 2.5 | 2.0 | 1.6 | 1.25 | 1.0 | 0.8 | 0.63 | 0.4 | <0.4 |
|---|---|---|---|---|---|---|---|---|---|
| %: | 1.0 | 1.5 | 8.5 | 19.0 | 31.5 | 22.0 | 11.0 | 5.0 | 0.5 |

Example D 4, with a zinc phosphate as the sparingly soluble inorganic compound.

The method is as described for Examples C 13–20. However, 1.05 parts of Na$_3$PO$_4$.12 H$_2$O and 0.64 part of ZnCl$_2$ are used. After precipitating the zinc phosphate, the pH of the aqueous phase is brought to 7.5 with dilute NaOH. Furthermore, 30 g of a 2% strength copolymer dispersion (B 7) are added to the aqueous phase.

The bead polymer has the following bead size distribution:

| φ: | 2.5 | 2.0 | 1.6 | 1.25 | 1.0 | 0.8 | 0.63 | 0.4 | <0.4 |
|---|---|---|---|---|---|---|---|---|---|
| %: | — | 3.0 | 33.5 | 21.0 | 20.5 | 13.5 | 4.0 | 3.0 | 1.5 |

Example D 5, with aluminum hydroxide as the sparingly soluble inorganic compound.

The aluminum hydroxide is produced by adding 150 ml of a 25% strength aqueous ammonia solution to a solution of 241.5 g of AlCl$_3$.6 H$_2$O in 600 ml of water whilst stirring. The styrene suspension polymerization batch consists of 200 parts of water, 0.03 part of sodium pyrophosphate, 5.0 parts of the stated aluminum hydroxide suspension, 100 parts of styrene, 0.1 part of sodium polyacrylate (the viscosity of a 10% strength solution is 3.8 cp at 20° C.) as a pigment-distributing agent, 0.15 part of dibenzoyl peroxide and 0.30 part of t-butyl perbenzoate. The styrene bead polymerization is carried out with constant stirring, for 2 hours at 80° C. and 12 hours at 90° C. 40 minutes after reaching 80° C., 1.0 part of a 10% strength polyvinyl chloride dispersion (B 4) is added. 4 hours after reaching 80° C., 7 parts of n-pentane are added. The bead polymer has the following bead size distribution:

| φ: | 2.5 | 2.0 | 1.6 | 1.25 | 1.0 | 0.8 | 0.63 | 0.4 | <0.4 |
|---|---|---|---|---|---|---|---|---|---|
| %: | 0.5 | 1.0 | 23.0 | 35.0 | 10.0 | 19.0 | 5.0 | 4.0 | 1.5 |

Example D 6, with barium carbonate as the sparingly soluble inorganic compound.

The method followed is as described in Example D 4. The barium carbonate suspension is prepared by adding 76 g of ammonium carbonate in 200 ml of water to a solution of 194 g of BaCl$_2$.2 H$_2$O in 600 ml of water, whilst stirring. 10 parts of the said barium carbonate suspension are added to the suspension polymerization batch. 40 minutes after reaching 80° C., 1.0 part of a 10% strength vinyl chloride dispersion (see B 4) is added. The bead polymer has the following bead size distribution:

| $\phi$: | 2.0 | 1.6 | 1.25 | 1.0 | 0.8 | 0.63 | 0.4 | <0.4 |
|---|---|---|---|---|---|---|---|---|
| %: | — | 10.5 | 20.5 | 30.0 | 25.0 | 9.0 | 3.5 | 1.5 |

Example D 7, using a mixture of a calcium phosphate and barium sulfate.

The barium sulfate dispersion used is prepared at 30° C. by adding a solution of 112 g of $Na_2SO_4$, dissolved in 360 ml of water, to a solution of 240 g of $BaCl_2.2\ H_2O$, dissolved in 720 ml of water, with vigorous stirring (thus obtaining a 13% strength $BaSO_4$ suspension).

The method described in Example D 1 is followed. However, a calcium phosphate suspension is first prepared in the aqueous phase from 0.46 part of $Na_3PO_4.12\ H_2O$ and 0.3 part of $CaCl_2.2\ H_2O$. 2.2 parts of the barium sulfate suspension are then added. After 60 minutes at 90° C., 0.7 part of a 10% strength vinyl chloride dispersion (B 4) is added. The bead polymer has the following bead size distribution:

| $\phi$: | 2.0 | 1.6 | 1.25 | 1.0 | 0.8 | 0.63 | 0.4 | <0.4 |
|---|---|---|---|---|---|---|---|---|
| %: | — | 16.0 | 28.5 | 19.0 | 13.5 | 13.5 | 7.5 | 2.0 |

Example D 8, using a mixture of a calcium phosphate and aluminum hydroxide.

The method described in Example D 1 is followed. A calcium phosphate suspension is first prepared in the aqueous phase from 0.46 part of $Na_3PO_4.12\ H_2O$ and 0.30 part of $CaCl_2.2\ H_2O$. 3 parts of the aluminum hydroxide suspension from Example D 5 are then added. 60 minutes after reaching 90° C., 0.7 part of a 10% strength copolymer dispersion (B 7) is added. The bead polymer has the following bead size distribution:

| $\phi$: | 2.0 | 1.6 | 1.25 | 1.0 | 0.8 | 0.63 | 0.4 | <0.4 |
|---|---|---|---|---|---|---|---|---|
| %: | — | 7.0 | 19.5 | 28.5 | 30.0 | 10.0 | 3.5 | 1.5 |

We claim:

1. A process for the manufacture of expandable beads of styrene polymer, consisting essentially of polymerizing styrene in aqueous suspension in the presence of a suspension stabilizer,
   wherein said suspension stabilizer is used in the amount of from 0.05 to 1% by weight, based on the suspension, said stabilizer being made up of:
   (A) from 99 to 50% by weight of particles having a particle size of from 0.01 to 100 μm of a sparingly water-soluble phosphate of a divalent or trivalent metal and
   (B) from 1 to 50% by weight of a finely-divided preformed water-insoluble polymer of
      (i) from 100 to 90 parts by weight of one or more of the monomers which form water-insoluble homopolymers selected from the group consisting of styrene, butadiene, vinyl chloride, vinylidene chloride, a vinyl ester or an acrylic or methacrylic ester and
      (ii) from 0 to 10 parts by weight of one or more monomers which form water-soluble homopolymers, said preformed polymer being employed in the form of an aqueous dispersion having particle sizes up to 10 μm;
   said process further including the addition of a blowing agent to the suspension before, during or after the polymerization of the styrene.

2. The process of claim 1, wherein the sparingly soluble inorganic metal compound A is introduced into the aqueous phase of the suspension before starting the polymerization and the finely divided polymer B is metered into the suspension in the course of the polymerization.

3. The process of claim 1, wherein the finely divided polymer B is metered in when the monomer conversion is from 5 to 40%.

4. The process of claim 1, wherein the metal compound A and the polymer B are premixed and are metered conjointly into the suspension before or during the polymerization.

5. The process of claim 1, wherein the mixture of the suspension stabilizers A and B is metered in when the monomer conversion is from 5 to 40%.

6. The process of claim 1, wherein a mixture of different sparingly soluble inorganic metal compounds A is employed.

7. The process of claim 1, wherein the sparingly soluble inorganic metal compound A comprises a calcium phosphate.

8. The process of claim 1, wherein a polystyrene dispersion is used as the finely divided polymer B.

9. The process of claim 1, wherein said vinyl ester is a vinyl ester of a saturated monocarboxylic acid having 2 to 12 carbon atoms, and said ester of acrylic acid or methacrylic acid is an ester thereof with a straight chain, a branced chain or a cyclic alkanol having 1 to 18 carbon atoms.

10. The process of claim 1, wherein the monomers which form water-soluble homopolymers are $\alpha,\beta$-olefinically unsaturated monocarboxylic or dicarboxylic acids having 3 to 5 carbon atoms, or the amides thereof.

11. The process of claim 1, wherein said particles are undissolved particles of a sparingly water-soluble inorganic metal carbonate, phosphate, silicate, oxide or hydroxide of a divalent or trivalent metal.

12. The process of claim 1, wherein the metals are calcium, barium, strontium, magnesium, aluminum, zinc, iron, cobalt and manganese.

13. The process of claim 1, wherein the polymerization is carried out at a temperature of 80° to 120° C.

* * * * *